United States Patent
Schwägerl et al.

(10) Patent No.: US 10,213,845 B2
(45) Date of Patent: Feb. 26, 2019

(54) ROTARY TOOL, IN PARTICULAR A DRILL, AND A CUTTING HEAD FOR SAID ROTARY TOOL

(71) Applicant: Kennametal Inc., Latrobe, PA (US)

(72) Inventors: Jürgen Schwägerl, Vohenstrauss (DE); Berthold Heinrich Zeug, Fürth (DE); Horst Manfred Jäger, Nürnberg (DE); Herbert Rudolf Kauper, Erlangen (DE); Julia Tempelmeier, Roth (DE); Tim Guter, Fürth (DE)

(73) Assignee: KENNAMETAL INC., Latrobe, PA (US)

( * ) Notice: Subject to any disclaimer, the term of this patent is extended or adjusted under 35 U.S.C. 154(b) by 0 days.

(21) Appl. No.: 15/302,443

(22) PCT Filed: Mar. 24, 2015

(86) PCT No.: PCT/EP2015/056288
§ 371 (c)(1),
(2) Date: Oct. 6, 2016

(87) PCT Pub. No.: WO2015/154993
PCT Pub. Date: Oct. 15, 2015

(65) Prior Publication Data
US 2017/0028480 A1 Feb. 2, 2017

(30) Foreign Application Priority Data
Apr. 8, 2014 (DE) .................... 10 2014 206 796

(51) Int. Cl.
*B23B 51/02* (2006.01)
*B23B 51/06* (2006.01)

(52) U.S. Cl.
CPC .............. *B23B 51/02* (2013.01); *B23B 51/06* (2013.01); *B23B 2240/04* (2013.01);
(Continued)

(58) Field of Classification Search
CPC . B23B 51/02; B23B 2240/04; B23B 2251/02; B23B 2251/50
See application file for complete search history.

(56) References Cited

U.S. PATENT DOCUMENTS

| 22,394 | A | 12/1858 | White |
| 40,297 | A | 10/1863 | Wakefield |

(Continued)

FOREIGN PATENT DOCUMENTS

| AT | 9431 B | 10/1902 |
| CN | 1204976 A | 1/1999 |

(Continued)

OTHER PUBLICATIONS

Jul. 16, 2015 International Search Report Transmitted K-04390-WO-PCT.
(Continued)

*Primary Examiner* — Daniel Howell
(74) *Attorney, Agent, or Firm* — Ian K. Samways

(57) ABSTRACT

A rotary tool designed as a modular drill, extending in an axial direction along an axis of rotation. It comprises two coupling parts: a carrier; and a cutting head that is attached to the carrier so as to be exchangeable. The carrier includes pin receiving means, into which a coupling pin of the cutting head is introduced in a clamping manner and so as to be reversibly exchangeable. The pin receiving means and the coupling pin have torque sections and clamping sections that correspond to one another and are oriented parallel to the axis of rotation. In addition, to prevent axial pull-out, stop surfaces are provided on the pin receiving means and on the coupling pin, the stop surfaces being effective in an axial direction and corresponding to one another. These stop surfaces preferably extend horizontally and therefore perpendicular to the axis of rotation.

20 Claims, 4 Drawing Sheets

(52) U.S. Cl.
CPC ....... *B23B 2240/32* (2013.01); *B23B 2250/12* (2013.01); *B23B 2251/02* (2013.01)

(56) References Cited

U.S. PATENT DOCUMENTS

| | | | |
|---|---|---|---|
| 44,915 A | 11/1864 | Baker | |
| 273,388 A | 3/1883 | Peatt | |
| 273,391 A | 3/1883 | Thrasher | |
| 329,660 A | 11/1885 | Lord | |
| 658,216 A | 9/1900 | Munger | |
| 690,093 A | 12/1901 | Beach | |
| 756,339 A | 4/1904 | Down | |
| 932,071 A | 8/1909 | Urbscheit | |
| 1,461,548 A | 7/1923 | West | |
| 2,158,120 A | 5/1939 | Hirschberg | |
| 2,289,583 A | 7/1942 | Malone | |
| 2,294,969 A | 9/1942 | Engvall | |
| 3,140,749 A | 7/1964 | Dionisotti | |
| 3,153,356 A | 10/1964 | Dearborn | |
| 3,293,727 A | 12/1966 | Simms | |
| 3,359,837 A | 12/1967 | Andreasson | |
| 3,410,749 A | 11/1968 | Chmiel | |
| 3,434,553 A | 3/1969 | Weller | |
| 3,548,688 A | 12/1970 | Kuch | |
| 3,765,496 A | 10/1973 | Flores | |
| 4,293,253 A | 10/1981 | Ott | |
| D262,219 S | 12/1981 | Lassiter | |
| D263,598 S | 3/1982 | Lassiter | |
| D273,387 S | 4/1984 | Lassiter | |
| D273,388 S | 4/1984 | Lassiter | |
| D273,389 S | 4/1984 | Lassiter | |
| D273,390 S | 4/1984 | Lassiter | |
| D273,391 S | 4/1984 | Lassiter | |
| D273,682 S | 5/1984 | Lassiter | |
| D274,436 S | 6/1984 | Lassiter | |
| 4,561,812 A | 12/1985 | Linden | |
| 4,744,704 A | 5/1988 | Galvefors | |
| 4,844,643 A | 7/1989 | Icks | |
| 5,024,563 A | 6/1991 | Randall | |
| 5,114,286 A | 5/1992 | Calkins | |
| 5,154,549 A | 10/1992 | Isobe | |
| 5,154,550 A | 10/1992 | Isobe | |
| 5,228,812 A | 7/1993 | Noguchi | |
| 5,346,335 A | 9/1994 | Harpaz | |
| 5,429,199 A | 7/1995 | Sheirer | |
| 5,452,971 A | 9/1995 | Nevills | |
| 5,509,761 A | 4/1996 | Grossman | |
| 5,634,747 A | 6/1997 | Tukala | |
| 5,649,794 A | 7/1997 | Kress | |
| 5,685,671 A | 11/1997 | Packer | |
| 5,769,577 A | 6/1998 | Boddy | |
| 5,791,838 A | 8/1998 | Hamilton | |
| 5,863,162 A | 1/1999 | Karlsson | |
| 5,904,455 A | 5/1999 | Krenzer | |
| 5,957,631 A | 9/1999 | Hecht | |
| 5,971,673 A * | 10/1999 | Berglund | ................ B23B 51/02 408/1 R |
| 5,980,166 A | 11/1999 | Ogura | |
| 5,988,953 A | 11/1999 | Berglund | |
| 5,996,714 A | 12/1999 | Massa | |
| 6,000,000 A | 12/1999 | Hawkins | |
| 6,012,881 A | 1/2000 | Scheer | |
| 6,045,301 A | 4/2000 | Kammermeier | |
| 6,059,492 A | 5/2000 | Hecht | |
| 6,071,045 A | 6/2000 | Janness | |
| 6,109,841 A | 8/2000 | Johne | |
| 6,123,488 A | 9/2000 | Kasperik | |
| 6,276,879 B1 | 8/2001 | Hecht | |
| 6,447,218 B1 | 9/2002 | Lagerberg | |
| 6,481,938 B2 | 11/2002 | Widin | |
| 6,485,235 B1 | 11/2002 | Mast | |
| 6,506,003 B1 | 1/2003 | Erickson | |
| 6,514,019 B1 | 2/2003 | Schulz | |
| 6,524,034 B2 | 2/2003 | Eng | |
| 6,530,728 B2 | 3/2003 | Eriksson | |
| 6,582,164 B1 | 6/2003 | McCormick | |
| 6,582,184 B2 | 6/2003 | McCormick | |
| 6,595,305 B1 | 7/2003 | Dunn | |
| 6,595,727 B2 | 7/2003 | Arvidsson | |
| 6,626,614 B2 | 9/2003 | Nakamura | |
| 6,648,561 B2 | 11/2003 | Kraemer | |
| 6,840,717 B2 | 1/2005 | Eriksson | |
| 7,008,150 B2 | 3/2006 | Krenzer | |
| 7,048,480 B2 | 5/2006 | Borschert | |
| 7,070,367 B2 | 7/2006 | Krenzer | |
| 7,114,892 B2 | 10/2006 | Hansson | |
| 7,125,207 B2 | 10/2006 | Craig | |
| 7,134,816 B2 | 11/2006 | Brink | |
| 7,189,437 B2 | 3/2007 | Kidd | |
| 7,237,985 B2 | 7/2007 | Leuze | |
| 7,306,410 B2 | 12/2007 | Borschert | |
| 7,309,196 B2 | 12/2007 | de Souza | |
| 7,311,480 B2 | 12/2007 | Heule | |
| 7,360,974 B2 | 4/2008 | Borschert | |
| 7,377,730 B2 | 5/2008 | Hecht | |
| 7,407,350 B2 | 8/2008 | Hecht | |
| 7,431,543 B2 | 10/2008 | Buettiker | |
| 7,467,915 B2 | 12/2008 | de Souza | |
| 7,559,382 B2 | 7/2009 | Koch | |
| 7,591,617 B2 | 9/2009 | Borschert | |
| D607,024 S | 12/2009 | Dost et al. | |
| 7,625,161 B1 | 12/2009 | Filho Ruy Frota de Souza | |
| 7,677,842 B2 | 3/2010 | Park | |
| 7,740,472 B2 | 6/2010 | Delamarche | |
| 7,775,751 B2 | 8/2010 | Hecht | |
| 7,832,967 B2 | 11/2010 | Borschert | |
| D632,320 S | 2/2011 | Chen et al. | |
| D633,534 S | 3/2011 | Chen et al. | |
| 7,972,094 B2 | 7/2011 | Men | |
| RE42,644 E | 8/2011 | Mats | |
| 7,997,832 B2 | 8/2011 | Prichard | |
| 8,007,208 B2 | 8/2011 | Noureddine | |
| 8,021,088 B2 | 9/2011 | Hecht | |
| 8,142,116 B2 | 3/2012 | Frejd | |
| D668,697 S | 10/2012 | Hsu | |
| D669,923 S | 10/2012 | Watson et al. | |
| 8,366,358 B2 | 2/2013 | Borschert | |
| 8,376,669 B2 | 2/2013 | Jaeger | |
| 8,430,609 B2 | 4/2013 | Frejd | |
| 8,449,227 B2 | 5/2013 | Danielsson | |
| 8,534,966 B2 | 9/2013 | Hecht | |
| 8,556,552 B2 | 10/2013 | Hecht | |
| 8,596,935 B2 | 12/2013 | Fang | |
| 8,678,722 B2 | 3/2014 | Aare | |
| 8,678,723 B2 | 3/2014 | Osawa | |
| 8,721,235 B2 | 5/2014 | Kretzschmann | |
| D708,034 S | 7/2014 | Huang | |
| 8,784,018 B2 | 7/2014 | Päbel | |
| 8,784,019 B2 | 7/2014 | Päbel | |
| D711,719 S | 8/2014 | DeBaker | |
| 8,807,888 B2 | 8/2014 | Borschert | |
| 8,882,413 B2 | 11/2014 | Hecht | |
| 8,931,982 B2 | 1/2015 | Osawa | |
| 8,992,142 B2 | 3/2015 | Hecht | |
| 9,028,180 B2 | 5/2015 | Hecht | |
| 9,050,659 B2 | 6/2015 | Schwaegerl | |
| 9,073,128 B2 | 7/2015 | Mack | |
| 9,079,255 B2 | 7/2015 | Jager | |
| 9,162,295 B2 | 10/2015 | Päbel | |
| D742,714 S | 11/2015 | King, Jr. et al. | |
| D742,948 S | 11/2015 | Kenno et al. | |
| 9,180,650 B2 | 11/2015 | Fang | |
| 9,205,498 B2 | 12/2015 | Jaeger | |
| 9,248,512 B2 | 2/2016 | Aare | |
| 9,296,049 B2 | 3/2016 | Schwaegerl | |
| 9,302,332 B2 | 4/2016 | Scanlon | |
| 9,371,701 B2 | 6/2016 | Cox | |
| 9,481,040 B2 | 11/2016 | Schwaegerl | |
| 9,498,829 B2 | 11/2016 | Zabrosky | |
| D798,921 S | 10/2017 | Frota De Souza Filho | |
| D798,922 S | 10/2017 | Frota De Souza Filho | |
| 2001/0033780 A1 | 10/2001 | Berglund | |
| 2002/159851 A1 | 10/2002 | Krenzer | |
| 2002/0168239 A1 | 11/2002 | Mast | |

(56) References Cited

U.S. PATENT DOCUMENTS

| | | |
|---|---|---|
| 2002/0195279 A1 | 12/2002 | Bise |
| 2003/0039523 A1 | 2/2003 | Kemmer |
| 2003/0091402 A1 | 5/2003 | Lindblom |
| 2004/0240949 A1 | 12/2004 | Pachao-Morbitzer |
| 2005/0084352 A1 | 4/2005 | Borschert |
| 2005/0135888 A1 | 6/2005 | Stokey |
| 2006/0072976 A1 | 4/2006 | Frota de Souza |
| 2006/0093449 A1 | 5/2006 | Hecht et al. |
| 2008/0003072 A1 | 1/2008 | Kim |
| 2008/0175676 A1 | 7/2008 | Prichard |
| 2008/0175677 A1 | 7/2008 | Prichard |
| 2008/0181741 A1 | 7/2008 | Borschert |
| 2008/0193231 A1 | 8/2008 | Jonsson |
| 2008/0193237 A1 | 8/2008 | Men |
| 2009/0044986 A1 | 2/2009 | Jaeger et al. |
| 2009/0067942 A1 | 3/2009 | Tanaka |
| 2009/0071723 A1 | 3/2009 | Mergenthaler |
| 2009/0116920 A1 | 5/2009 | Bae |
| 2009/0123244 A1 | 5/2009 | Buettiker |
| 2009/0311060 A1 | 12/2009 | Frejd |
| 2010/0021253 A1 | 1/2010 | Frejd |
| 2010/0092259 A1 | 4/2010 | Borschert et al. |
| 2010/0143059 A1 | 6/2010 | Hecht |
| 2010/0247255 A1 | 9/2010 | Nitzsche |
| 2010/0266357 A1 | 10/2010 | Kretzschmann |
| 2010/0272529 A1 | 10/2010 | Rozzi |
| 2010/0307837 A1 | 12/2010 | King et al. |
| 2010/0322723 A1 | 12/2010 | Danielsson |
| 2010/0322728 A1 | 12/2010 | Aare |
| 2010/0322729 A1 | 12/2010 | Päbel |
| 2010/0322731 A1 | 12/2010 | Aare |
| 2011/0020072 A1 | 1/2011 | Chen |
| 2011/0020073 A1 | 1/2011 | Chen |
| 2011/0020077 A1 | 1/2011 | Fouquer |
| 2011/0020086 A1 | 1/2011 | Borschert et al. |
| 2011/0027021 A1 | 2/2011 | Nelson |
| 2011/0081212 A1 | 4/2011 | Spichtinger |
| 2011/0097168 A1 | 4/2011 | Jager |
| 2011/0110735 A1 | 5/2011 | Klettenheimer |
| 2011/0110739 A1 | 5/2011 | Frisendahl |
| 2011/0168453 A1 | 7/2011 | Kersten et al. |
| 2011/0229277 A1 | 9/2011 | Hoffer |
| 2011/0236145 A1 | 9/2011 | Päbel |
| 2011/0299944 A1 | 12/2011 | Höfermann |
| 2011/0318128 A1 | 12/2011 | Schwägerl et al. |
| 2012/0003056 A1 | 1/2012 | Jaeger |
| 2012/0014760 A1 | 1/2012 | Glimpel |
| 2012/0082518 A1 | 4/2012 | Woodruff |
| 2012/0087746 A1 | 4/2012 | Fang |
| 2012/0087747 A1 | 4/2012 | Fang |
| 2012/0099937 A1 | 4/2012 | Osawa |
| 2012/0121347 A1 | 5/2012 | Osawa |
| 2012/0308319 A1 | 12/2012 | Sampath |
| 2012/0315101 A1 | 12/2012 | Osawa et al. |
| 2013/0183107 A1 | 7/2013 | Fang |
| 2013/0183112 A1 | 7/2013 | Schwagerl |
| 2013/0209189 A1 | 8/2013 | Borschert |
| 2013/0223943 A1 | 8/2013 | Gey |
| 2013/0259590 A1 | 10/2013 | Shaheen |
| 2013/0266389 A1 | 10/2013 | Hecht |
| 2014/0023449 A1 | 1/2014 | Jonsson |
| 2014/0255115 A1 | 9/2014 | Zabrosky |
| 2014/0255116 A1 | 9/2014 | Myers |
| 2014/0301799 A1 | 10/2014 | Schwaegerl |
| 2014/0321931 A1 | 10/2014 | Gey |
| 2014/0348602 A1 | 11/2014 | Schwaegerl |
| 2015/0063926 A1 | 3/2015 | Wu |
| 2015/0063931 A1 | 3/2015 | Wu |
| 2015/0104266 A1 | 4/2015 | Guter |
| 2015/0174671 A1 | 6/2015 | Maurer |
| 2015/0266107 A1 | 9/2015 | Gonen |
| 2015/0273597 A1 | 10/2015 | Aliaga |
| 2015/0298220 A1 | 10/2015 | Ach |
| 2015/0321267 A1 | 11/2015 | Takai |
| 2015/0328696 A1 | 11/2015 | Wang |
| 2016/0001379 A1 | 1/2016 | Kauper |
| 2016/0001381 A1 | 1/2016 | Lach |
| 2016/0016236 A1 | 1/2016 | Evans |
| 2016/0031016 A1 | 2/2016 | Takai |
| 2016/0059323 A1 | 3/2016 | Riester |
| 2016/0207122 A1 | 7/2016 | Chen |
| 2016/0229017 A1 | 8/2016 | Guy |
| 2016/0263663 A1 | 9/2016 | Schwaegerl |
| 2016/0263664 A1 | 9/2016 | Son |
| 2016/0263666 A1 | 9/2016 | Myers |
| 2016/0311035 A1 | 10/2016 | Peng |

FOREIGN PATENT DOCUMENTS

| | | |
|---|---|---|
| CN | 1258240 A | 6/2000 |
| CN | 1616170 A | 5/2005 |
| CN | 100455390 C | 1/2009 |
| CN | 101605622 A | 12/2009 |
| CN | 106825693 A | 10/2016 |
| DE | 94340 | 9/1896 |
| DE | 384720 C | 11/1923 |
| DE | 524677 | 5/1931 |
| DE | 118806 | 9/1984 |
| DE | 3733298 C2 | 4/1992 |
| DE | 19605157 | 9/1996 |
| DE | 19543233 | 5/1997 |
| DE | 29809638 | 9/1998 |
| DE | 19945097 | 3/2001 |
| DE | 102004022747 A1 | 11/2005 |
| DE | 102007044095 A1 | 3/2009 |
| DE | 102012200690 | 7/2013 |
| DE | 102012212146 | 1/2014 |
| DE | 102013205889 | 5/2014 |
| DE | 102013209371 A1 | 11/2014 |
| DE | 102015106374 A1 | 10/2016 |
| EP | 118806 | 9/1984 |
| EP | 0599393 | 6/1994 |
| EP | 1136161 | 9/2001 |
| EP | 813459 | 7/2003 |
| EP | 1476269 | 10/2009 |
| EP | 1996358 | 11/2011 |
| EP | 2524755 | 11/2012 |
| EP | 2551046 A1 | 1/2013 |
| FR | 907980 | 3/1946 |
| GB | 17961 | 12/1915 |
| GB | 1395855 | 5/1975 |
| JP | 5537209 | 3/1980 |
| JP | 11019812 A | 1/1999 |
| JP | 2002113606 A | 4/2002 |
| JP | 2004255533 A | 9/2004 |
| JP | 2005118940 | 5/2005 |
| JP | 2005169642 | 6/2005 |
| JP | 2008500195 A | 1/2008 |
| JP | 2011036977 A | 2/2011 |
| JP | 6211769 | 9/2017 |
| WO | 8403241 | 8/1984 |
| WO | WO1984003241 | 8/1984 |
| WO | WO9627469 | 9/1996 |
| WO | 9853943 | 12/1998 |
| WO | WO03031104 A1 | 4/2003 |
| WO | 2007107294 | 9/2007 |
| WO | WO2008072840 A2 | 6/2008 |
| WO | WO2009128775 A1 | 10/2009 |
| WO | WO2010102793 A1 | 9/2010 |

OTHER PUBLICATIONS

Nov. 15, 2016 EPO Notification R161(1) & R.162 K-04390-EP-EPT.
Sep. 6, 2017 Final Office Action P15-06098-US-NP.
Sep. 19, 2017 Final Office Action P15-06102-US-NP.
Mar. 10, 2017 Office action (3 months) 1 P15-06097-US-NP.
Mar. 21, 2017 Office action (3 months) 1 P15-06102-US-NP.
Apr. 6, 2017 First office action K-04390-DE-NP.
Mar. 22, 2017 First office action K-04277-DE-NP.
Apr. 6, 2017 Second Office Action K-04261-IL-NP.
Apr. 19, 2017 First office action K-04261-CN-NP.

(56) References Cited

OTHER PUBLICATIONS

May 9, 2017 Second Office Action K-04055-JP-NP.
Apr. 1, 2017 First office action K-04262-CN-NP.
May 25, 2017 Office action (3 months) 3 K-04261-US-NP.
Jun. 27, 2017 Office action (3 months) 2 K-04277-US-NP.
Sep. 2, 2015 First office action K-04055-SE-NP.
Jul. 14, 2017 Office action (3 months) 1 K-05995-US-NP.
Jul. 7, 2017 Office action (3 months) 1 K-04089-US-NP.
Jul. 7, 2015 Office action (3 months) 1 K-04091-US-NP.
Oct. 22, 2015 Office action (3 months) 1 K-04261-US-NP.
Nov. 3, 2015 Final Office Action K-04089-US-NP.
Nov. 6, 2015 Final Office Action K-04091-US-NP.
Oct. 12, 2015 First office action K-04261-IL-NP.
Dec. 8, 2015 Office action (3 months) 1 K-04262-US-NP.
Feb. 23, 2016 Office action (3 months) 2 K-04091-US-NP.
May 13, 2014—Office Action—K4262EDE1.
Mar. 7, 2016 Final Office Action K-04261-U5-NP.
Mar. 3, 2016 First office action K-04055-CN-NP.
Apr. 8, 2016 Office action (2 months) P15-06102-EM-CD.
Nov. 11, 2016 Second Office Action K-04055-CN-NP.
Jun. 16, 2016 Office action (3 months) 1 K-04277-US-NP.
Jul. 29, 2016 Office action (3 months) 2 K-04261-US-NP.
Jul. 13, 2016 First office action P15-06102-IL-RD.
Sep. 27, 2016 First office action K-04055-JP-NP.
Oct. 20, 2016 Office action (3 months) 1 P15-06097-US-DP.
Oct. 25, 2016 Office action (3 months) 1 P15-06102-US-DP.
Nov. 15, 2016 EPO Notitoation R161(1) & R.162 K-04390-EP-EPT.
Nov. 23, 2016 Final Office Action 2 K-04261-US-NP.
Dec. 12, 2017 Second Office Action K-04261-CN-NP.
Dec. 18, 2017 Second Office Action K-04262-CN-NP.
Nov. 17, 2017 First office action P16-06223-DE-NP.
Jan. 11, 2018 First office action K-04390-CN-PCT.

* cited by examiner

ROTARY TOOL, IN PARTICULAR A DRILL, AND A CUTTING HEAD FOR SAID ROTARY TOOL

BACKGROUND OF THE INVENTION

The invention relates to a rotary tool, in particular a drill, with the features of the preamble of claim 1. The invention furthermore relates to a cutting head for said rotary tool.

The rotary tool, in particular a drill, is what is known as a modular rotary tool which extends in an axial direction along an axis of rotation and which comprises two coupling parts, namely a carrier and a cutting head, wherein the cutting head is attached to the carrier so as to be exchangeable. For this purpose, the carrier usually comprises on its end surface two opposite fastening webs which are separated from each other by means of flutes and by means of which a pin receiving means is delimited. A coupling pin of the cutting head is inserted into this pin receiving means. This is carried out by turning the cutting head around the axis of rotation relative to the carrier. During said turning, a clamping connection between the cutting head and the carrier is formed so that the two coupling parts are held together in a clamping manner. In particular, no additional fastening means (such as screws or the like) are arranged therein. The pin receiving means of the carrier comprises inner shell surfaces and the coupling pin of the cutting head comprises outer shell surfaces, which shell surfaces reciprocally interact with each other. Torque sections respectively corresponding to one another for transmitting a torque on the one hand, as well as clamping sections corresponding to one another for transmitting a radial clamping force on the other hand, are formed on the inner shell surfaces and on the outer shell surfaces. In the connected state, these sections respectively abut against one another in pairs.

Such a rotary tool can be learned from DE 10 2012 200 690 A1, for example. The present invention relates to a development of the rotary tool described therein.

In the coupling connection known from this prior art, the torque sections as well as the clamping sections on the coupling pin and on the carrier are arranged successively in the circumferential direction. The coupling pin has an approximately cuboid design, wherein sections are cut out from the cuboid shape by means of flute sections. For axial tightening and an axial pull-out lock, either the clamping sections corresponding to one another and/or the torque sections corresponding to one another form a dovetail connection. The respective sections are therefore oriented in a diagonally inclined manner with respect to the axis of rotation.

A modified embodiment variant of the coupling connection to be learned from DE 10 2012 200 690 A1 is to be learned from DE 10 2013 205 889.6, which was not published at the time of application. Here, the torque sections as well as the clamping sections are arranged staggered in relation to one another in an axial direction so that either torque sections or clamping sections are formed at an axial level. In this embodiment variant, a dovetail connection is also formed by diagonally inclined torque sections or clamping sections to achieve axial tightening and to prevent pulling-out in an axial direction.

A positive lock effective in an axial direction is formed by means of such a dovetail connection known from the prior art. This is made possible due to the specific fastening method with the turning of the coupling pin of the cutting head into the pin receiving means of the carrier.

Another similar coupling connection in a drill can be learned from U.S. Pat. No. 6,582,164 B1. In this case, webs protruding radially outward are formed on the outer shell surfaces of the coupling pin, said webs being screwed into a corresponding recess in the pin receiving means in the manner of a thread. The shell surfaces of these threaded webs are arranged in a diagonally inclined manner with respect to the axis of rotation for easy screwing-in.

Finally, another coupling connection can be learned from U.S. Pat. No. 7,070,367 B2, in which once again webs are formed on the outside of the coupling pin, said webs being arranged helically and forming a screw thread by means of which axial tightening of the cutting head in an axial direction takes place during screwing-in. The helical web comprises roof surfaces diagonally inclined with respect to the axis of rotation.

In the coupling connections described so far and known from the prior art, the coupling pin is respectively completely enclosed by the pin receiving means, i.e. by the two opposite clamping or fastening webs, so that both the torque sections and the clamping sections are enclosed by the fastening webs.

In contrast thereto, coupling connections are also known in which the torque sections are not enclosed by the clamping webs but rather extend in the radial direction to an outer circumferential line of the rotary tool so that a circumferential side of the coupling pin is flush with a circumferential side of the carrier in the area of the torque section. A coupling connection of this type can be learned from DE 10 2012 212 146 A1, for example. In this embodiment variant, the surfaces corresponding to one another of the torque sections are once again formed in a diagonally inclined manner in order to prevent pulling-out in an axial direction.

Overall, the known coupling connections are characterized by a complex geometry, which is sometimes very complicated with respect to the production process.

OBJECT OF THE INVENTION

Starting therefrom, the invention is based on the object of providing a coupling connection that is simple to produce.

Achievement of the Object

The object is achieved according to the present invention by a rotary tool, in particular a drill, with the features of claim 1. The rotary tool extends in an axial direction along an axis of rotation and comprises two coupling parts, namely a carrier and a cutting head. The cutting head is attached in to the carrier by means of screwing in, so as to be reversibly exchangeable. For this purpose, the carrier comprises on its end surface in particular diagonally opposite fastening webs which are preferably separated from each other by means of flutes, with inner shell surfaces by means of which a pin receiving means is delimited. In said pin receiving means, a coupling pin of the cutting head is introduced in a clamping manner. The coupling pin has outer shell surfaces. By turning the coupling pin with respect to the pin receiving means, the outer shell surfaces come into contact with the inner shell surfaces, wherein torque sections respectively corresponding to one another for transmitting a torque and clamping sections corresponding to one another for transmitting a radial clamping force are formed. These sections respectively come to abut against each other in pairs when the cutting head is attached to the carrier. The torque sections are therefore enclosed by the fastening webs and do not extend to a radial circumferential side of the carrier.

In order to allow for simple production of the coupling parts for this coupling connection, the clamping sections as well as the torque sections extend parallel to the axis of rotation. In addition, in order to prevent pulling-out in an axial direction, stop surfaces are formed on the pin receiving means and on the coupling pin, said stop surfaces being effective in an axial direction and corresponding to one another. The corresponding stop surfaces form a positive lock effective in an axial direction.

This embodiment is based on the consideration that the production of diagonally inclined surfaces for the clamping sections or for the torque sections with the required high precision is expensive with respect to the production process. It is therefore provided that these sections extend only parallel to the axis of rotation. The function of the axial pull-out lock is carried out by means of the separate, i.e. additional, stop surfaces independently of the surfaces for clamping in the clamping section and for torque transmission in the torque section. The coupling pin and the pin receiving means preferably respectively comprise a pair of torque sections and a pair of clamping sections which are respectively arranged diagonally opposite with respect to the axis of rotation. The entire coupling pin is preferably interrupted by groove sections of flutes in the same manner that the fastening webs are separated from one another by groove sections of flutes. Furthermore, the cutting head is attached in a purely clamping manner without any additional fastening means, such as screws, namely exclusively by turning the cutting head around the axis of rotation relative to the carrier.

The torque sections are generally oriented such that they transmit a torque exerted by the carrier onto the cutting head during the processing procedure, i.e. during the drilling process. For this purpose, the torque sections generally comprise a surface section which is oriented at an angle to a circumferential direction. In contrast, the clamping sections are preferably not designed to transmit a torque. They preferably extend in the circumferential direction along cylinder shell surfaces. In a deviation from a pure cylinder shape, these clamping sections can possibly also extend along an elliptical line when viewed in cross-section.

With respect to simple production, the stop surfaces preferably directly adjoin a respective torque section or a respective clamping section. The stop surfaces therefore extend outward or inward in the radial direction from a torque or clamping section.

With respect to simple production, in an expedient embodiment the stop surfaces extend horizontally and therefore perpendicularly to the axis of rotation. The stop surfaces of each coupling part lie entirely within a common horizontal plane for which the axis of rotation forms a surface normal.

In an expedient embodiment, the stop surfaces corresponding to one another of the pin receiving means on the one hand, and of the coupling pin on the other hand, abut against each other or at most have a small axial clearance between each other. A small axial clearance is permissible since the axial pull-out lock is not required during the actual drilling process since the cutting head is forced into the pin receiving means. However, the pull-out lock is required, for example, if the drill is pulled out of a drill hole.

In contrast, a preferred development provides that an interference fit is formed between the corresponding stop surfaces of the two coupling parts, the stop surfaces therefore being pressed against each other in the mounted condition. In order to make this possible, a lead-in chamfer is expediently respectively formed so that, when the coupling pin is screwed into the pin receiving means, the coupling pin is pulled into the pin receiving means in an axial direction before the interference fit is formed between the stop surfaces extending horizontally. The lead-in chamfer extends in the circumferential direction only over a small angular range of, for example, less than 5°. The stop surfaces, which preferably extend horizontally, are expediently formed on one of the two coupling parts by means of a web protruding radially outward, the web extending in the circumferential direction in the manner of a ring segment. Said radially protruding web is in particular formed on the coupling pin of the cutting head, namely in a rear end section of the cutting head.

The web generally comprises in an axial direction a significantly smaller axial height than the torque or clamping sections. For example, its axial height extending in an axial direction is only less than 20% of the axial height of the clamping and torque sections.

The web extends in the circumferential direction either over the entire inner shell surface and outer shell surface or alternatively only over a partial area thereof. For example, the web is formed only in the area of the torque sections or only in the area of the clamping sections, or it respectively extends over the torque sections and over the clamping sections in the circumferential direction.

With regard to a particularly simple design with respect to the production process, the clamping sections and the torque sections of the one coupling part—in particular of the cutting head—are formed by means of an undercut. In order to produce these sections, the outer shell surfaces of the coupling pin and/or the inner shell surfaces of the pin receiving means are therefore processed with only one grooving tool by advancing said grooving tool in the radial direction, for example.

At the same time, the stop surfaces for the axial pull-out lock are also formed in said undercut so that the stop surfaces thus directly adjoin the torque sections or clamping sections. Generally, the surfaces adjoining the undercut on both sides therefore lie on a common shell surface, in particular on a common cylinder shell surface. In the latter instance of the cylinder shell surface, the surfaces adjoining the undercut therefore lie at the same radius.

The coupling pin is preferably substantially in the shape of a rectangular block, wherein the clamping sections and the torque sections are formed on its circumferential side. Expediently, the clamping sections are formed on a narrow side (in particular by cylinder shell surfaces) and the torque sections are formed on a long side (in particular by surface sections extending parallel to one another). The torque sections are approximately diagonally opposite each other with respect to the axis of rotation.

Groove sections of flutes interrupt the cuboid form, wherein concave recesses are respectively removed from the cuboid form in diagonally opposite corner regions by means of the flutes.

Between the linearly extending clamping sections and the clamping sections extending (circularly) in an arc shape, rounded transitional sections forming the corner regions are respectively formed on the two coupling parts. The transitional sections of the coupling parts do not interact, however, i.e. do not abut against each other in a clamping manner. Rather, a clearance is formed between the corresponding transitional sections of the coupling parts.

The clamping sections as well as the torque sections are preferably arranged at the same axial height and are therefore not staggered in relation to one another in an axial direction. They in particular extend over the same axial length in an axial direction.

The object is furthermore achieved according to the present invention by a cutting head for said rotary tool according to the features of claim 9. The advantages and preferred embodiments mentioned with regard to the rotary tool are also to be transferred analogously to the cutting head.

The cutting head extends in an axial direction along an axis of rotation and comprises a coupling pin with outer shell surfaces on which torque sections as well as clamping sections are formed. The torque sections as well as the clamping sections extend parallel to the axis of rotation. Furthermore, stop surfaces for an axial pull-out lock are formed on the coupling pin, said stop surfaces being effective in an axial direction. The torque sections and the clamping sections on the one hand, or alternatively the stop surfaces on the other hand, are formed by an undercut, whereby a simple production is made possible. Expediently, the stop surfaces are formed as horizontally extending boundary surfaces of the undercut.

DESCRIPTION OF FIGURES

An exemplary embodiment of the present invention is explained in greater detail below based on Figures. These show.

Parts having the same effect are given the same reference symbols in Figures.

DESCRIPTION OF THE EXEMPLARY EMBODIMENT

Figure 1A:
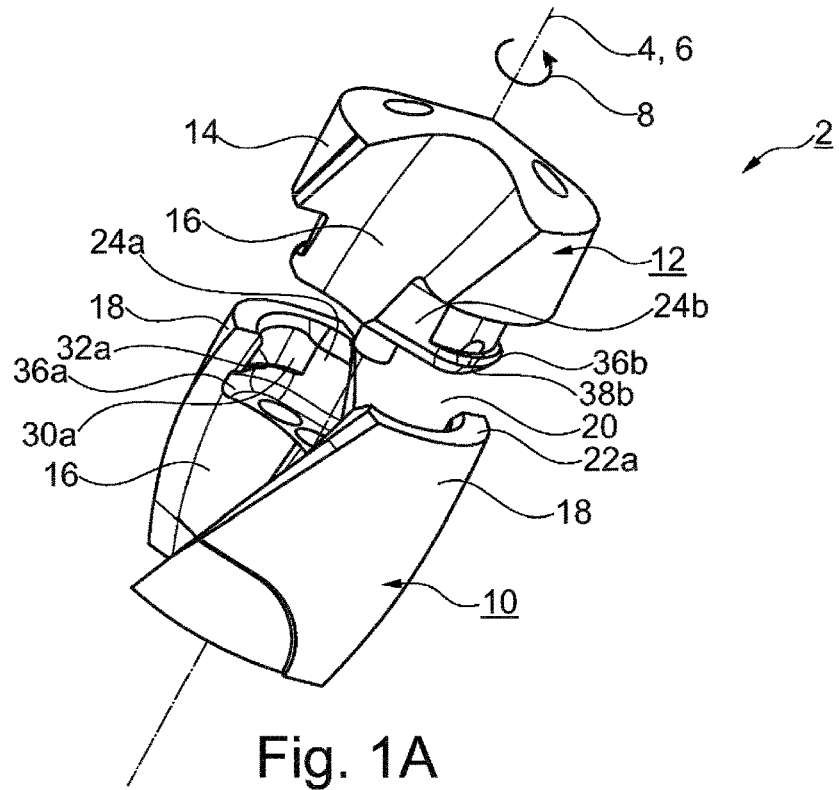
FIG. 1A a perspective illustration in section of a modular drill with cutting head and carrier, which are illustrated in the manner of an exploded view, FIG. 1B the drill illustrated in section according to FIG. 1A, in a somewhat tilted exploded view compared to FIG. 1A, FIG. 2A a top view of the bottom side of the cutting head according to FIGS. 1A, 1B, FIG. 2B a lateral view of the cutting head according to FIG. 2A, FIG. 2C another lateral view of the cutting head according to FIG. 2A, wherein the cutting head is rotated by 90° compared to FIG. 2B, FIG. 3A a top view of the carrier according to FIG. 1A, FIG. 3B a section view through the carrier according to FIG. 3A along the section line I-I, FIG. 4A a top view of the carrier according to FIG. 1A, wherein the carrier is rotated by 90° compared to FIG. 3A and FIG. 4B a section view through the carrier according to the section line II-II in FIG. 4A.

The rotary tool 2 illustrated in Figures is designed as a modular drilling tool. It extends in an axial direction 4 along an axis of rotation 6. The rotary tool 2 rotates about the axis of rotation 6 during normal operation in the direction of rotation, which at the same time defines a circumferential direction 8.

The rotary tool 2 is composed of a carrier 10 and a cutting head 12 that can be attached thereto so as to be exchangeable. The cutting head 12 comprises major cutting edges (not calculated [sic] here in more detail) which are usually connected centrally at a drill face to one another via cross-cutting edges and which extend radially outward. Against the direction of rotation, major free spaces adjoin the major cutting edges at the end surface. On its circumferential side, the cutting head 12 comprises a rear surface 14 which is interrupted by opposite flutes 16. Said flutes thus already start at the cutting head 12 and transition into the carrier 10. In the exemplary embodiment, the flutes 16 extend approximately helically. The carrier 10 is a grooved shaft section at which continue, for example, minor cutting edges which extend along the flutes 16 and start at the cutting head 12. A grooved shaft section of the carrier 10 is usually additionally adjoined by a non-grooved clamping section with which the rotary tool 2 is clamped in a machine tool.

Below, elements on the carrier 10 that correspond to one another are designated with the letter a and elements on the cutting head 12 that correspond to one another are designated with the letter b.

The carrier 10 comprises on its end surface two approximately diagonally opposite fastening webs 18 which are interrupted by flutes 16. The fastening webs 18 respectively extend over a range of approximately 70°-90°. The fastening webs 18 are respectively delimited at the end surface by planar end support surfaces 22a which are arranged in a common horizontal plane, with respect to which the axis of rotation 6 is thus oriented perpendicularly.

The pin receiving means 20 is delimited on the circumferential side by inner shell surfaces 24a of the fastening webs 18. Furthermore, it is delimited on the bottom side by a bottom surface which extends horizontally, i.e. perpendicular to the axis of rotation 6. In this bottom surface, a centering hole 26a is introduced concentrically to the axis of rotation 6. Furthermore, in exemplary embodiment 2, coolant channels 28 extend in the carrier 10, end in the bottom surface, and there are flush with corresponding coolant channels 28 of the cutting head 12.

At the inner shell surfaces 24a, the carrier 10 respectively comprises torque sections 30a, clamping sections 32a as well as transitional sections 34a which directly adjoin one another in the circumferential direction 8. Directly adjoining the bottom surface, grooves 36a are introduced into the inner shell surfaces 24a. Said grooves form horizontally extending stop surfaces 38a.

Corresponding to the pin receiving means 20, the cutting head 12 comprises a coupling pin 40 extending in an axial direction 4. The coupling pin 40 is radially set back in the radial direction from the circumferential surfaces of the rear surface 14. Corresponding to the pin receiving means 20, the coupling pin 40 comprises outer shell sections 24b on which torque sections 30b, clamping sections 32b, and transitional sections 24b are also formed. These sections respectively adjoin one another in the circumferential direction 8, are not arranged staggered in relation to one another in an axial direction 4, and are therefore respectively at the same axial height.

A radial projection toward the rear surface 14 is formed by means of the coupling pin 40 that is radially set back, whereby two head support surfaces 22b are formed which in turn are arranged in a common horizontal plane and separated from each other by the flutes 16.

Concentric to the axis of rotation 6, a lead-in pin 26b is furthermore formed on the coupling pin 40, said lead-in pin only being formed as a first centering aid for the cutting head 12 during introduction into the carrier 10. The actual centering of the cutting head 12 is carried out via the clamping sections 32a,b.

Furthermore, the coupling pin 40 respectively comprises webs 36b at its rear section facing away from the end surface of the cutting head 12, which webs 36b are respectively formed in the manner of ring segments and directly adjoin the clamping sections 32*b*. The webs 36*b* form stop surfaces 38*b* extending radially outward in the horizontal direction. Correspondingly thereto, the grooves 36*a*—which are respectively also formed as annular groove segments—are formed on the pin receiving means 20 in the area of the bottom. Said grooves also directly adjoin the torque section 30*a*.

On the sides of the coupling pin 40, the torque sections 30*b* and the clamping sections 32*b* are formed by means of an undercut so that these sections 30*b*, 32*b* and the transitional section 34*b* are formed by removing material. In this case, the undercut is made directly adjoining the head support surface 22*b*. In the transitional section, only a small curvature is provided. Accordingly, the sections 30*a*, 32*a*, 34*a* extend on the sides of the carrier 10 to the end support surface 22*a*, apart from an end surface lead-in chamfer.

In the exemplary embodiment, when viewed in the circumferential direction 8 the webs 36*b* and correspondingly the grooves 36*a* and accordingly the stop surfaces 38*a,b* extend over only a partial section of the fastening webs 18. They are respectively tapered off toward one of the two flutes 16 so that a screwing-in of the coupling pin 40 into the pin receiving means 20 is made possible.

The webs 36*b* and correspondingly the grooves 36*a* respectively comprise a shell surface which extends approximately parallel to the axis of rotation 6 and which is adjoined by a conical end section. The shell surfaces extend in an axial direction 4 over a comparatively short area in comparison to the axial extension of the sections 30*a,b*; 32*a,b*; 34*a,b*.

Figure 2A:
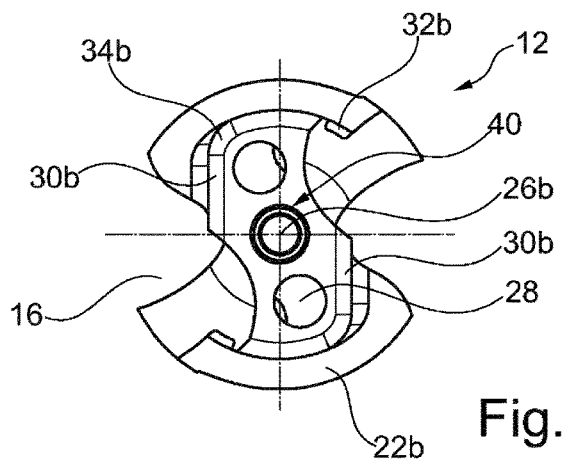
Figure 2B:
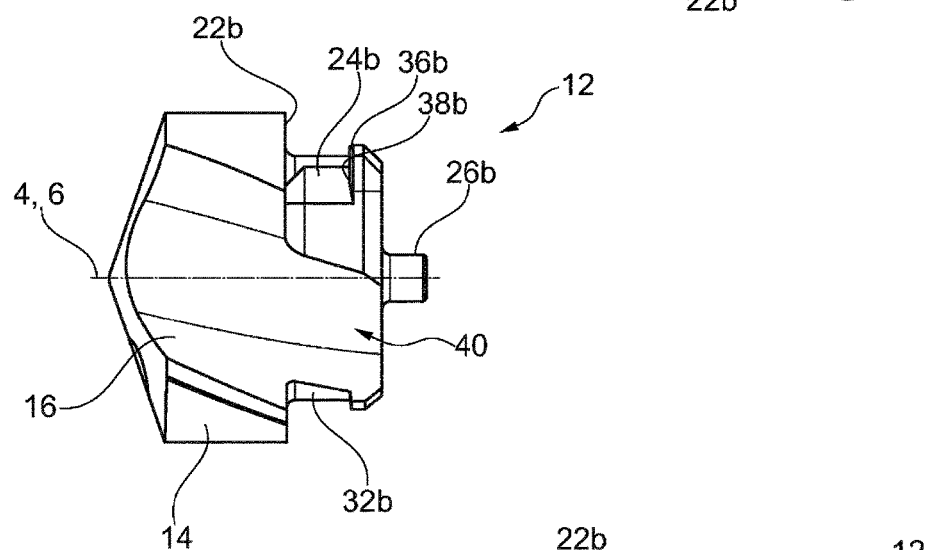
Figure 2C:
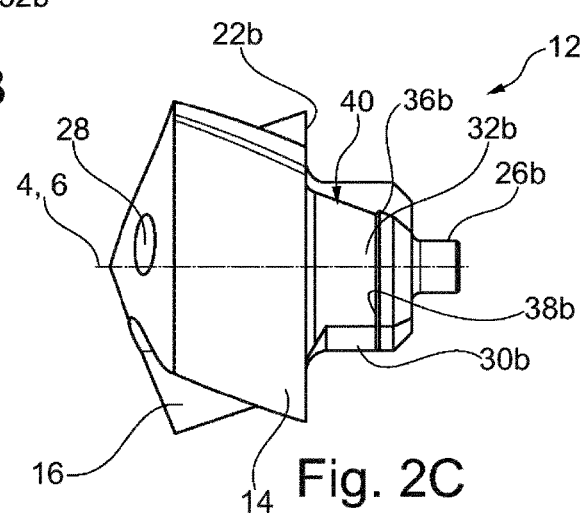
Figure 3A:
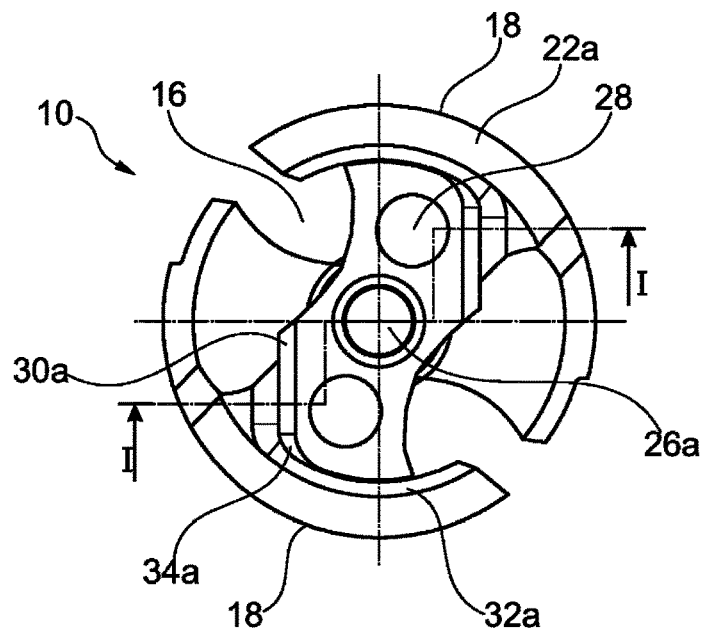
Figure 3B:
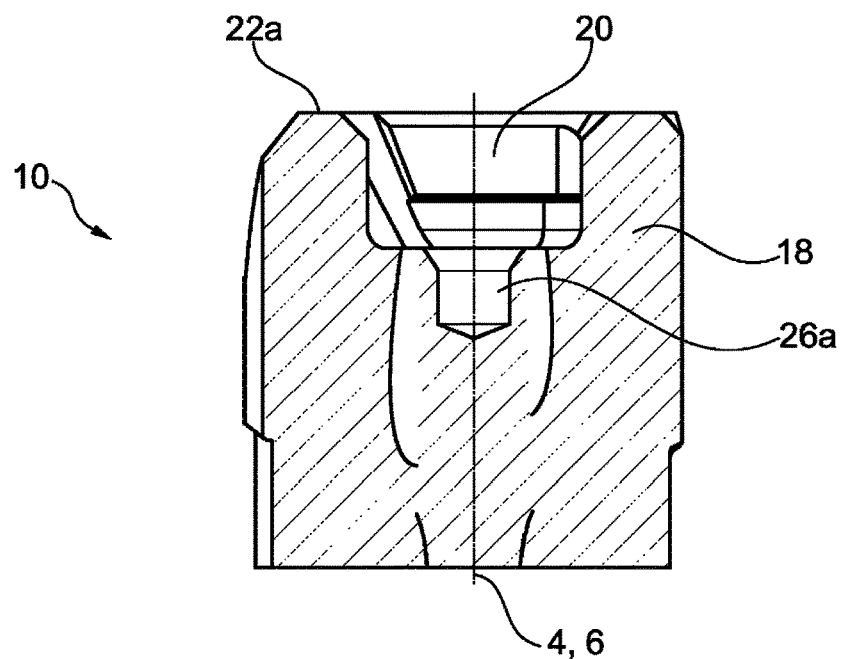
Figure 4A:
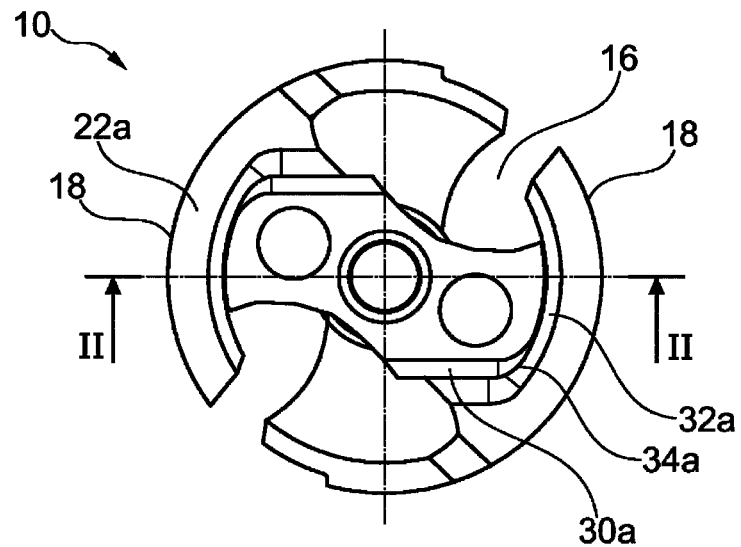
Figure 4B:
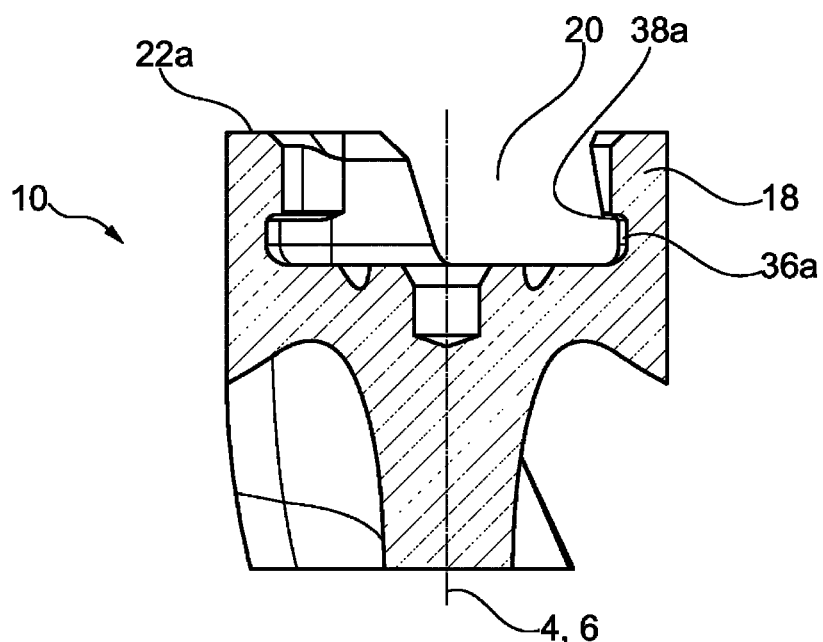

As can be seen in particular in the top views of the cutting head 12 according to FIG. 2A and the top views of the carrier 10 according to FIGS. 3A and 4A, the coupling pin 40 and the pin receiving means 20 have a substantially rectangular design and thus an approximately cuboid shape. In this case, however, opposite corner regions of the approximately rectangular cross-section are removed as a result of the flutes 16. The clamping sections 32*a,b* are formed on the narrow sides of this approximately rectangular cross-section and the torque sections 30*a,b* are formed on the long sides. As can be seen, the torque sections 30*a,b* extend linearly when viewed in cross-section, whereas the clamping sections 32*a,b* extend along an arc, in particular a circular arc. The corner regions of the approximately rectangular cross-section are rounded so that the linear torque section 30*a* transitions into the rounded clamping section 32*a,b*. The rounded corner regions are formed by transitional sections 34*a,b*.

The section surfaces of the coupling pin 40 and of the pin receiving means 20, namely the torque sections 30*a,b*, the clamping sections 32*a,b*, and the transitional sections 34*a,b* extend parallel to the axis of rotation 6 and thus to the axial direction 4. They therefore do not comprise an inclination angle and do not form any conical surfaces. In this way they can be formed simply, in particular by means of the already described undercut.

Figure 1B:
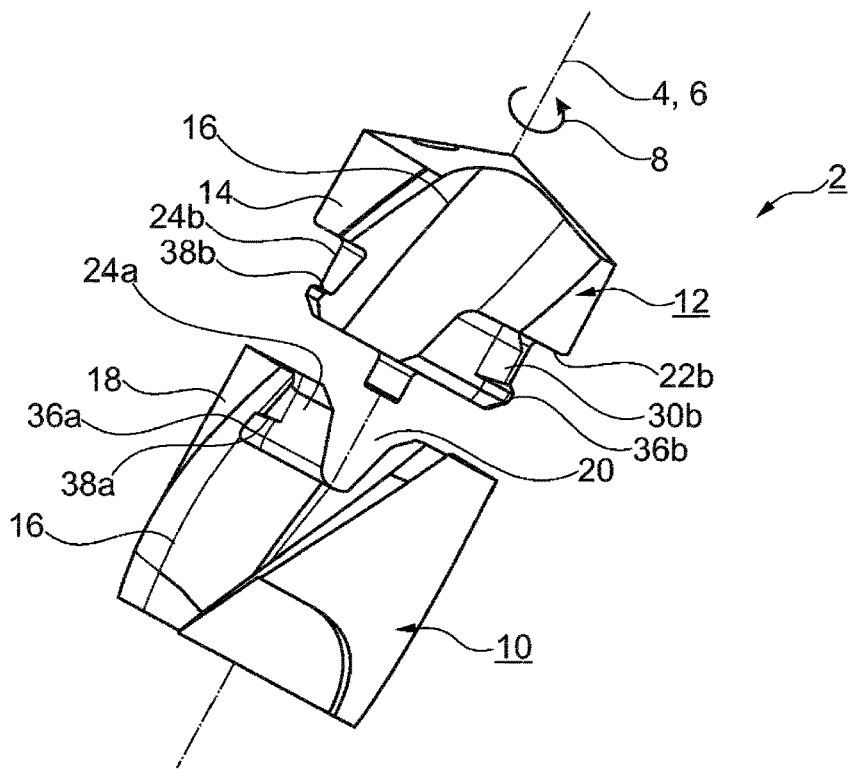

For mounting the cutting head 12, it is initially inserted in an axial direction 4 with its coupling pin 40 forward into the pin receiving means 20. Here, it is turned by approximately 90° compared to the position illustrated in FIGS. 1A and 1B. For this initial axial insertion, the lead-in pin 26*b* offers a first centering support. Subsequently, the entire cutting head 12 is turned against the direction of rotation around the axis of rotation 6 within the pin receiving means 20. In doing so, the webs 36*b* engage behind the grooves 36*a*. Additionally, the clamping sections 32*a,b* form an interference fit and thus a clamping relationship. In the process, a radial clamping force is exerted by the fastening webs 18 at the clamping sections 32*a,b* on the coupling pin 40. In the final position, the torque sections 30*a,b* corresponding to one another furthermore come into contact with each other. During operation, the torque exerted by the carrier 10 is transmitted via the torque sections 30*a,b* in the direction of rotation and circumferential direction 8 to the cutting head 12. In the mounted final position, the head support surfaces 22*b* rest flat on the end support surfaces 22*a*.

Via the horizontally extending stop surfaces 38*a,b* corresponding to one another, a reliable axial pull-out lock is formed by the engaging of the webs 36*b* behind the grooves 36*a*. Expediently, an interference fit is also formed therewith so that—when the coupling pin 40 is screwed into the pin receiving means 20—the coupling pin 40 is also at the same time brought in the axial direction 4 into a defined axial position in the pin receiving means 20.

For this purpose, a small lead-in chamfer is preferably arranged on the grooves 36*a* and the webs 36*b*. As an alternative to forming the interference fit in the area of the stop surfaces 38*a,b*, said stop surfaces possibly abut against each other with a small clearance.

The invention claimed is:

1. A rotary tool which extends in an axial direction along an axis of rotation, the rotary tool comprising:
   two coupling parts, comprising a carrier and a cutting head;
   the cutting head comprising a coupling pin and being exchangeably attached to the carrier;
   the carrier comprising:
      an end surface and fastening webs disposed at the end surface, wherein the fastening webs comprise inner shell surfaces; and
      a pin receiver delimited by the fastening webs;
   the coupling pin comprising outer shell surfaces;
   wherein the coupling pin is clamped into the pin receiver via turning the cutting head relative to the carrier;
   each of the inner shell surfaces and outer shell surfaces comprising torque sections and clamping sections formed thereon;
   the torque sections of the inner shell surfaces and the torque sections of the outer shell surfaces abutting against one another pairwise, for transmitting a torque;
   the clamping sections of the inner shell surfaces and the clamping sections of the outer shell surfaces abutting against one another pairwise, for transmitting a radial clamping force;
   wherein the clamping sections and the torque sections of the inner shell surfaces and of the outer shell surfaces are oriented at the same angle with respect to the axis of rotation; and
   the pin receiver and the coupling pin each comprising stop surfaces for preventing axial pull-out of the cutting head, wherein the stop surfaces are configured and disposed to act in a generally axial direction with respect to one another.

2. The rotary tool according to claim 1, wherein the stop surfaces extend horizontally and, with respect to an axial direction, are each disposed adjacent to one of the torque sections or clamping sections.

3. The rotary tool according to claim 1, wherein an interference fit is formed between at least one stop surface of the pin receiver and at least one stop surface of the coupling pin.

4. The rotary tool according to claim 1, wherein the stop surfaces are formed on the coupling pin via a web extending in a circumferential direction.

5. The rotary tool according to claim 1, wherein the stop surfaces are formed on the pin receiver via a web extending in a circumferential direction.

6. The rotary tool according to claim 5, wherein the stop surfaces each extend, in a circumferential direction, over an entirety of the inner shell surfaces and the outer shell surfaces.

7. The rotary tool according to claim 5, wherein the stop surfaces each extend, in a circumferential direction, over a partial area of the inner shell surfaces and outer shell surfaces.

8. The rotary tool according to claim 1, wherein the clamping sections and the torque sections of the cutting head comprise a formation resulting from an undercut.

9. The rotary tool according to claim 1, wherein:
the coupling pin is substantially cuboid; and
the clamping sections and the torque sections of the coupling pin are formed at peripheral sides of the coupling pin.

10. The rotary tool according to claim 1, wherein the clamping sections are arranged at the same axial position with respect to the torque sections.

11. The rotary tool according to claim 1, wherein the clamping sections and the torque sections of the inner shell surfaces and of the outer shell surfaces extend in parallel to the axis of rotation.

12. The rotary tool according to claim 1, wherein the rotary tool comprises a drill.

13. A cutting head for a rotary tool, wherein the cutting head extends in an axial direction along an axis of rotation, the cutting head comprising:

a coupling pin comprising outer shell surfaces;
the outer shell surfaces comprising torque sections and clamping sections formed thereon;
wherein the clamping sections and the torque sections are oriented at the same angle with respect to the axis of rotation; and
the pin receiver comprising stop surfaces for preventing axial pull-out of the cutting head, wherein the stop surfaces are configured and disposed to act in a generally axial direction.

14. The cutting head according to claim 13, wherein the stop surfaces extend horizontally and, with respect to an axial direction, are each disposed adjacent to one of the torque sections or clamping sections.

15. The cutting head according to claim 13, wherein the stop surfaces are formed on the coupling pin via a web extending in a circumferential direction.

16. The cutting head according to claim 13, wherein:
the coupling pin is substantially cuboid; and
the clamping sections and the torque sections are formed at peripheral sides of the coupling pin.

17. The cutting head according to claim 13, wherein the clamping sections comprise a formation resulting from an undercut.

18. The cutting head according to claim 13, wherein the torque sections comprise a formation resulting from an undercut.

19. The cutting head according to claim 13, wherein the stop surfaces comprise a formation resulting from an undercut.

20. The cutting head according to claim 19, wherein the stop surfaces comprise horizontally extending boundary surfaces resulting from the undercut.

* * * * *